United States Patent
Spalten

(10) Patent No.: US 8,909,681 B2
(45) Date of Patent: Dec. 9, 2014

(54) GAP DETECTION IN A TEMPORALLY UNIQUE INDEX IN A RELATIONAL DATABASE

(71) Applicant: International Business Machines Corporation, Armonk, NY (US)

(72) Inventor: Randall P. Spalten, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 13/783,422

(22) Filed: Mar. 4, 2013

(65) Prior Publication Data

US 2014/0052703 A1    Feb. 20, 2014

Related U.S. Application Data

(63) Continuation of application No. 13/589,316, filed on Aug. 20, 2012, now abandoned.

(51) Int. Cl.
    *G06F 17/30*    (2006.01)
(52) U.S. Cl.
    CPC .... *G06F 17/30339* (2013.01); *G06F 17/30551* (2013.01)
    USPC .......................................................... 707/803
(58) Field of Classification Search
    USPC .................. 707/2, 3, 703, 803; 709/204–206
    See application file for complete search history.

(56) References Cited

U.S. PATENT DOCUMENTS

| 6,684,215 | B1 | 1/2004 | Saracco |
| 7,606,826 | B2 | 10/2009 | Li et al. |
| 2011/0320419 | A1* | 12/2011 | Johnston et al. .............. 707/703 |
| 2013/0091112 | A1 | 4/2013 | Iyer et al. |

OTHER PUBLICATIONS

Baraka, Ahmed. "Oracle 10g Data Guard", http://blogimg.chinaunix.net/blog/upfile2/100124182749.pdf. Sep. 2006. pp. 1-10.
Elkayam, Zohar. "Oracle Data Guard from A to Z", http://zoharelkayam.files.wordpress.com/ 2011/11/zohar_elkayam_20302.pdf. 2011. pp. 1-205.
USPTO Notice of Allowance and Fee(s) Due. U.S. Appl. No. 13/589,316. Dated Jul. 1, 2013.

* cited by examiner

*Primary Examiner* — Etienne Leroux
(74) *Attorney, Agent, or Firm* — Mollborn Patents, Inc.; Fredrik Mollborn

(57) ABSTRACT

Methods for gap detection in a temporally unique index in a relational database. A temporally unique index is provided in a relational database. The index includes a first set of keys, each including one or more non-temporal and two temporal key parts. In response to receiving an insert, update, or delete statement for a changed row, the rows with identical non-temporal key parts to the changed row are identified. The temporal key parts of the identified rows are compared to the temporal key parts of the changed row to determine whether: the changed row is directly adjacent to a temporally earlier row and temporally later row, a gap is detected between the changed row and a temporally earlier row, or a gap is detected between the changed row and a temporally later row.

21 Claims, 4 Drawing Sheets

Original Index and Gap List

```
Index            Gap list
--------         --------
T0 -> T1
                 T1 -> T2
T2 -> T3
T3 -> T4
T4 -> T5
```

Original Index and Gap List

```
Index             Gap list
--------          --------
T0 -> T1
                  T1 -> T2
T2 -> T3
T3 -> T4
T4 -> T5
```

FIG. 1

Case A1

```
Index             Gap list
--------          --------
T2 -> T3
T3 -> T4
T4 -> T5
```

FIG. 2

Case A2

```
Index           Gap list
--------        --------
T0 -> T1
                T1 -> T3
T3 -> T4
T4 -> T5
```

FIG. 3

Case A3

```
Index           Gap list
--------        --------
T0 -> T1
                T1 -> T2
T2 -> T3
                T3 -> T4
T4 -> T5
```

FIG. 4A

Case A3

```
Index           Gap list
--------        --------
T0 -> T1
                T1 -> T4
T4 -> T5
```

FIG. 4B

```
                Case B

Index              Gap list
--------           --------
T0 -> T1
                   T1 -> T2
T2 -> T3
                   T3 -> T4
T4 -> T5
```

FIG. 5

```
                Case C

Index              Gap list
--------           --------
T0 -> T1
T1 -> T2
T2 -> T3
T3 -> T4
T4 -> T5
```

FIG. 6

Case D

```
Index       Gap list
--------    --------
T0 -> T1
            T1 -> T4
T4 -> T5
```

FIG. 7A

Case D

```
Index       Gap list
--------    --------
T0 -> T1
            T1 -> T2
T2 -> T3
            T3 -> T4
T4 -> T5
```

FIG. 7B

Case E

```
Index       Gap list
--------    --------
T0 -> T1
            T1 -> T4
T4 -> T5
```

FIG. 8A

Case E

```
Index       Gap list
--------    --------
T0 -> T1
            T1 -> T3
T3 -> T4
T4 -> T5
```

FIG. 8B

GAP DETECTION IN A TEMPORALLY UNIQUE INDEX IN A RELATIONAL DATABASE

BACKGROUND

The present invention relates to relational databases, and more specifically, to gap detection in a temporally unique index in a relational database. A relational database can be generally described as a collection of data items organized as a set of formally described tables from which data can be accessed easily. The software used in a relational database is typically referred to as a Relational Database Management System (RDBMS). One example of an RDBMS is the DB2 Universal Database (DB2 UDB), which is available from International Business Machines Corporation of Armonk, N.Y.

One type of tables that is often used in a RDBMS is Application-Maintained Temporal Tables. Temporal Tables contain data that is known to be valid for a given duration of time. For example, the interest rate of a loan to a customer has a certain value each month or year, but the rate may fluctuate during the lifespan of the loan. There are two types of constraints that database servers can handle on top of Application-Maintained Temporal Tables: Temporal Uniqueness and Gap Elimination.

Temporal Uniqueness constraints (also referred to as "WITHOUT OVERLAPS" constraints in the DB2 UDB system) ensures that each row of an Application-Maintained Temporal Table describes a discrete period of time, i.e. that a given customer's interest rate for a loan only has one value for any given instant of time during the life of the loan.

Gap Elimination constraints (herein also referred to as "WITHOUT GAPS") ensure that there is no gap in the values over the duration of the user's data, i.e., that there does not exist an instance of time from the start of the loan until the end of the loan for which no interest rate is recorded.

In some RDBMSs, such as the DB2 UDB, users can create their own gap-elimination triggers or Structured Query Language (SQL) queries to detect gaps. However, these SQL queries are much more complex than temporal uniqueness in that gap elimination queries need to use Online Analytical Processing (OLAP) or other analytical functions to determine the 'next' and 'previous' row values in an index, i.e.,

```
SELECT * FROM
    (SELECT STOCK_ID, MAX(END_DATE) OVER (ORDER BY
    BEGIN_DATE) GAP_START,
    LEAD(BEGIN_DATE) OVER (ORDER BY BEGIN_DATE)
    GAP_END FROM T1)
    WHERE GAP_START < GAP_END
```

Additionally, users who use a SQL-based gap elimination scheme may get "false positives," as the index is not locked after an Update/Delete/Insert (UDI) operation and before the SQL statement above is read, and it requires the users to tailor the queries to match the index they want to monitor for gaps.

Another alternative technique is to perform an index scan of the table after an UDI operation, searching all keys that match the non-temporal key parts that were modified, and ensuring that the end times of the current row equals the start time of the next row during the scan. However, this introduces issues with locking and concurrency, since the scan must take place after the index locks and page locks on the data have been released.

SUMMARY

According to various embodiments of the present invention, methods are provided for gap detection in a temporally unique index in a relational database. A temporally unique index is provided in a relational database. The temporally unique index includes a first set of keys. Each key in the first set of keys includes one or more non-temporal key parts and two temporal key parts indicating a temporal beginning value and a temporal end value. In response to receiving one of an insert statement, an update statement, and a delete statement pertaining to a changed row in the relational database, rows are identified in the temporally unique index that have identical non-temporal key parts to the changed row. The temporal key parts of the identified rows are compared to the temporal key parts of the changed row to determine: whether the changed row is directly adjacent to both a temporally earlier row and to a temporally later row, whether a gap is detected between the changed row and a temporally earlier row, or whether a gap is detected between the changed row and a temporally later row.

The details of one or more embodiments of the invention are set forth in the accompanying drawings and the description below. Other features and advantages of the invention will be apparent from the description and drawings, and from the claims.

DESCRIPTION OF DRAWINGS

FIGS. 1-8 show examples of how an index and a gap list are affected by various UDI operations, in accordance with various embodiments of the invention.

Like reference symbols in the various drawings indicate like elements.

DETAILED DESCRIPTION

Overview

The various embodiments described herein pertain to techniques that can be used by a RDBMS index manager, such as the DB2 Index Manager, for example, to maintain a list of gaps during UDI operations over a temporal index. As a result of using these techniques, the performance of the RDBMS can be improved, less application development time is needed for temporal UDI operations over a temporal index, and increased value is obtained for the users.

In accordance with the various embodiments, gap elimination can be checked for at the time of index insert, delete or update (an update is simply a delete followed immediately by an insert), if the following pieces of information are known: the changed row's start time (known already), the changed row's end time (known already), the previous row's end time (if it exists), and the next row's start time (if it exists).

The expression "previous row" and "next row," as used herein, refer to rows that match all other non-temporal key parts in the index. The previous and next values can be used to determine if the changed row was directly adjacent temporally to the two rows on either side, or if there were empty spaces (existing gaps).

An INSERT statement may create a gap (if the row to be inserted is not directly adjacent to the previous or next rows) or remove a gap (if the row to be inserted is directly adjacent to both the previous and next rows, i.e. in an UPDATE statement).

A DELETE statement may create a gap (if the row to be deleted is directly adjacent to both the previous and next rows) or remove a gap (if the row to be deleted is not directly adjacent to the previous or next row, i.e. in an UPDATE statement).

At times, an INSERT or DELETE statement may also extend or split or truncate an existing gap. The various techniques that will be described in further detail below use a gap detection algorithm, which keeps track of the minimum number of known gaps. As will also be described below, the algorithm is optimized for common scenarios, such as regular INSERT or DELETE of singleton data, or completely clearing a table (i.e. "DELETE FROM T1").

Some UPDATE statements may cause temporary gaps that will be resolved by the end of the UPDATE, that is, the following UPDATE statement

"UPDATE T1 SET BUS_START=BUS_START+1 MONTH, BUS_END=BUS_END+1 MONTH"

may, given the data in the table, cause temporary gaps in many rows, but the end result of the UPDATE is always a table with no gaps. This is because every transaction over a no-gaps index must complete with no gaps in the index or else the transaction rolls back. The end result of any database operation over such an index is always a table with no gaps, if the transaction started with a table with no gaps.

Once a gap is known, the gap can be added to a linked list stored in a shared area of memory accessible by all agents who may touch the table in question. The element of the linked list would contain the table id, object id, index id, non-temporal key parts (or a hashed value thereof, to save space), and the gap's Start and End times. The gap list may be searched by the algorithm below to find an existing gap if an UDI operation will remove that gap.

Once the operation is complete and all rows have been changed by the statement, finding out if the operation caused a gap is as simple as checking if the gap list has any members. This check can be done at the time of uniqueness violation checking for deferred uniqueness indexes. If an operation causes a gap, the transaction will be rolled-back.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some Illustrative Examples

The various embodiments of the invention will now be explained by way of example of different types of operations that can be performed in the RDBMS. For purposes of these examples, it is assumed that there is an index with keys $K0$, $K1, K2, \ldots, Kn$. Each key K consists of non-temporal key parts $Kp0, Kp1, \ldots, Kpn$ and two temporal key parts, $KpB$ and $KpE$ for temporal begin and end values. The temporal begin key part $KpB$ must be less than $KpE$, where $KpB$ is inclusive while $KpE$ is exclusive. These restrictions are inherent in temporal key part definitions. For temporal implementations where $KpB$ is allowed to be exclusive or $KpE$ is allowed to be inclusive, the techniques described below would need to be slightly modified.

Uniqueness in such a table could be defined in three different ways:

Non-Temporal uniqueness, which states that for all keys K, all key parts of K are distinct.

Temporal uniqueness without overlaps, which states in addition that for all distinct pairs of keys $K1$ and $K2$, all of the following are true:

If $K1pB<=K2pB$, then $Kp1E<K2pB$.
If $K1pE>=K2pE$, then $K1pB>=K2pE$.

Temporal uniqueness without overlaps or gaps, which states in addition that for all externally equal keys K (defined below), if a previous key PrevK exists that is externally equal to K but is temporally earlier than K, PrevK's $KpE$ is equal to K's $KpB$, and if a next key NextK exists that is externally equal to K but is temporally later than K, NextK's $KpB$ is equal to K's $KpE$. If all keys K in the index satisfy this requirement, the index is said to be temporally unique without gaps.

Let us call any two keys where $Kp0, Kp1 \ldots Kpn$ are equivalent externally equal keys, as the current version of the data will only contain one such key in a table that satisfies the temporal uniqueness constraint. For example, assuming there is a temporal index with two keys (Joe, '123', 01/01/12, 01/01/12) and (Joe, '123', 01/01/12, 03/01/12), they are externally equal. In other words, to the user querying the database, there is just one value (Joe, '123'), which has two validity periods, one from January-February and one from February-March. The non-temporal key parts of the keys are both equal, but the temporal (begin/end) key parts are different. The index keys themselves are, of course, completely different from the point of view of the database, but from the point of view of a user of a temporal application, they're equal.

No Gaps Checking

If an index does not contain a PrevK or NextK for a given key K, no gap checking is necessary in that temporal direction (earlier or later).

If an index contains a key K for which no other keys in the index are externally equal, that key K is said to have no gaps on either side.

An index with no keys at all is also said to satisfy the No Gaps restriction and the no temporal overlaps restriction.

In some embodiments, the no gaps restriction is only checked at the end of a DML (Data Manipulation Language) statement's execution. Assume that during SELECT operations, no locks need to exist on the index that would block readers, and for UDI operations, the externally equal keys of modified keys are exclusively locked by the database for the duration of the UDI operation.

For a No Gaps index, the index must begin any transaction in a consistent state, i.e., that all keys satisfy the temporally unique without gaps and without overlaps requirements.

Below are a few cases that can cause gaps to be created in the index during the course of an index Insert, Update or Delete statement.

Adding a Key

This operation adds a key to an index as part of a SQL statement. This operation can cause a gap to occur in the index if the new key K has an externally equal PrevK where the K→KpB is not equal to PrevK→KpE, or if new key K has an externally equal NextK where the K→KpE is not equal to NextK→KpB.

INSERT statements may add one or more keys to the index. For example, if more than one key is being added to the index (for example, as part of an INSERT from a SUBSELECT SQL statement), then the order of the keys being inserted is undefined. As was described above, temporary gaps may also be introduced by an INSERT statement, even if the final result of the INSERT statement is an index with no gaps. For this reason, errors cannot be thrown by an "add key" operation until the entire INSERT operation is complete.

A ROLLBACK in a database is performed by undoing all the operations of the transaction that is rolled back. One example of a ROLLBACK operation is undoing a delete operation, which is equivalent to adding the key into the index. During an undo of a DELETE, there should be no gaps created in the index, assuming the index was in a consistent no-gaps state before the DELETE began.

Adding the first key into an empty index, or adding the first externally equal key for a given set of non-temporal key parts will never create a gap. These two scenarios can be detected and gap detection can be disabled for the duration of this INSERT statement.

Deleting a Key

This operation removes a key from an index as part of a SQL statement. This operation can cause a gap to occur in the index if the deleted key K has an externally equal PrevK where K→KpB is equal to PrevK→KpE and the deleted key K has an externally equal NextK where K→KpE is equal to NextK→KpB. If the deleted key K does not have externally equal keys immediately before or after in the index, no gap can be created. Note that the gap detection algorithm for key deletion is opposite to that for key insertion.

DELETE statements may delete one or more keys from the index. If more than one key is being deleted from the index, then the order of the keys being deleted is undefined, and temporary gaps may be introduced by a DELETE statement, even if the final result of the DELETE statement is an index with no gaps. For this reason, errors cannot be thrown by the delete key operation until the entire DELETE operation is complete.

Deleting the last key of an index, or deleting the last externally equal key for a given set of non-Temporal key parts will never create a gap. These two scenarios can be detected and gap detection can be disabled for the duration of this DELETE statement.

UPDATE Operations

An UPDATE statement is handled as a deletion of a key, followed by an insertion of a different key. Thus, the above logic for adding or deleting keys happen within the UPDATE operation, and any gaps detected during the addition or deletion of a key are recorded in the gap list and only at the end of the statement if errors for gaps are thrown.

Maintaining the List of Temporary Gaps for an Operation

A gap is described by the beginning and end of its temporal range. The beginning and end values cannot be NULL, and cannot be negative infinity or positive infinity. A gap can only exist between two key values that were not deleted by the current UDI statement. In some embodiments, the list of known gaps is maintained as a searchable tree (such as a binary tree or B-tree), and each gap list is readable and writable by only one database work unit at a time, and will contain the list of gaps for one index at a time. This avoids multiple work units interfering with each other's gap checking Any time a gap is found during add or delete key operations, a gap entry is added to the gap list. The gap entry includes the non-temporal key parts, the gap start time, and the gap end time. The gap start and end times are determined by the next or previous externally equal key's start or end time, and the newly added or deleted key's begin or end time.

In this way, the gap list will act as a mirror to the index. Any value present in the index will not be in the gap list, and any gaps present in the gap list will not exist in the index. Therefore, to minimize the size of these gap lists, gaps that are found while adding and deleting keys will combine with known gaps, or remove known gaps, depending on certain rules.

To further illustrate this, please consider the following Cases A-E, which will be described below and with reference to the drawings. For purposes of the examples in Cases A-E below, it is assumed that there is a consistent index and a specific range of temporal key values, with temporal begin and end values T0, T1, T2, T3, T4 and T5. The temporal range T1→T2 is eliminated from the index, and gets added to the gap list, as shown in FIG. 1.

Case a: Newly Added Gap Adjacent to Existing Gap

If a newly added gap is adjacent to an existing gap in the list (i.e. the new gap's KpE is equal to an existing gap's KpB, and/or the new gap's KpB is equal to an existing gap's KpE), then the gaps on one or both sides will be affected by the addition of this gap.

Case A1: One example of this is if temporal range T0→T1 is deleted from the index. The gap list contains T1→T2, this new gap is adjacent and earlier than the existing gap, but itself has no earlier gap in the list. There is also no gap later than T1, therefore the deleting of value T0→T1 will necessitate the removal of gap T1→T2 from the gap list, leaving gap list empty. The index has no gaps in it at this point, since the earliest value is T2. Since gaps cannot have a beginning or ending time of infinity, if the earliest or latest value is deleted, this has the affect of removing the adjacent known gaps. The updated index and gap list are shown in FIG. 2

Case A2: Consider now a case where the temporal range T2→T3 is deleted from the index. The existing gap T1→T2 is then expanded to become a gap from T1→T3. The gap list still has only one known gap, even though two key values have been deleted from the index. In this way, the smallest number of gaps is recorded in the gap list, and it will never be larger than half the number of keys in the index itself. The updated index and gap list are shown in FIG. 3.

Case A3: Consider a case where the gap list contains two gaps, T1→T2 and T3→T4, as shown in FIG. 4A. A new gap, T2→T3, is introduced, which is adjacent to both gaps in the gap list. The earlier gap's KpE now becomes the later gap's KpE, and the later gap is removed from the list, leaving a single gap T1→T4 in the gap list, as shown in FIG. 4B.

Case B: Newly Added Gap has No Adjacent Gap

If the newly added gap has no adjacent gap in the list, but there is either an earlier or a later externally equal key value in the index, this is a new gap. For example, if from the original index and gap list shown in FIG. 1, T3→T4 were to be deleted from the index, this gap would be added to the gap list and would not be combined with or modify existing gap T1→T2, as shown in FIG. 5.

Case C: Gap is Deleted from the Gap List

If a gap is deleted from the gap list (that is, when index keys are added back to an index after being deleted within the same unit of work), and the gap exactly matches a known gap, then the gap is removed from the gap list. For example, if the existing gap T1→T2 is deleted from the gap list shown in FIG. 1, the resulting index and gap list will look like the index and gap list in FIG. 6.

Case D: Newly Deleted Gap is Completely Enclosed within Existing Gap

If a newly deleted gap is completely enclosed within an existing gap, the gap must split in two, with the earlier gap half having a KpE equal to the deleted gap's KpB, and the later gap half having a KpB equal to the deleted gap's KpE. For example, if the gap list contained T1→T4, as shown in FIG. 7A, and gap T2→T3 was removed, the gap list would contain T1→T2 and T3→T4, as shown in FIG. 7B.

Case E: Newly Deleted Gap is Partially Enclosed within Existing Gap

If a newly deleted gap is partially enclosed within an existing gap, the existing gap's begin or end time must be modified, in effect shortening the known gap. For example, if the gap list contained T1→T4, as shown in FIG. 8A, and gap T3→T4 was removed from the list, the existing gap would become T1→T3, as shown in FIG. 8B.

At the end of an operation, it is trivial to check for gap existence by looking at the gap list and seeing if any elements exist. An index operation that creates gaps will be rolled back, and during this rollback operation all gap checking can be suspended, as the rollback is guaranteed to resolve the index back to its original consistent state.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the various embodiments described herein can be handled by a gap list modeled as a B-Tree, or a hash table, or a linked list, or any Java collection (HashMap/TreeMap/etc), or an XML file, etc., as is familiar to those of ordinary skill in the art. As long as the rules are followed, the implementation of the gap list (or the index, or the database) is not mandated by the algorithm. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for gap detection in a temporally unique index in a relational database, comprising:
    providing a temporally unique index in a relational database, wherein the temporally unique index includes a first set of keys, wherein each key in the first set of keys includes one or more non-temporal key parts and two temporal key parts indicating a temporal beginning value and a temporal end value; and
    in response to receiving one of an insert statement, an update statement, and a delete statement pertaining to a changed row in the relational database,
        identifying rows in the temporally unique index that have identical non-temporal key parts to the changed row, and
        comparing the temporal key parts of the identified rows to the temporal key parts of the changed row to determine: whether the changed row is directly adjacent to both a temporally earlier row and to a temporally later row, whether a gap is detected between the changed row and a temporally earlier row, or whether a gap is detected between the changed row and a temporally later row.

2. The method of claim 1, further comprising:
    in response to detecting a gap, storing data about the gap in a gap list.

3. The method of claim 2, further comprising:
    storing the gap list in a shared area of memory accessible to agents that have permission to access the temporally unique index in the relational database.

4. The method of claim 3, wherein the gap list is maintained in the memory as a searchable tree.

5. The method of claim 2, wherein the gap list is a linked list that contains one or more of the following elements for each detected gap: a table identifier, an object identifier, an index identifier, non-temporal key parts, and start and end times for the gap.

6. The method of claim 5, further comprising:
    hashing at least some of the elements to preserve space in the memory.

7. The method of claim 2, further comprising:
    in response to receiving one of an insert statement, an update statement, and a delete statement pertaining to a changed row in the relational database, searching the gap list to determine whether the operation performed by the statement caused a gap.

8. The method of claim 7, wherein:
    the searching of the gap list is performed at the time of uniqueness violation checking for deferred uniqueness indexes; and
    in response to determining that the operation caused a gap, rolling back the operation that caused the gap.

9. The method of claim 2, wherein:
    the gap list is readable and writable by only one database work unit at a time; and
    the gap list contains gaps for only one temporally unique index at a time.

10. The method of claim 2, further comprising:
    reducing the size of the gap list by combining one or more gaps or by removing known gaps, in accordance with a pre-defined set of rules, when a newly identified gap is added to the gap list.

11. A computer program product for gap detection in a temporally unique index in a relational database, the computer program product comprising a computer readable storage medium having program code embodied therewith, the program code executable by a processor to:
    provide, by the processor, a temporally unique index in a relational database, wherein the temporally unique index includes a first set of keys, wherein each key in the first set of keys includes one or more non-temporal key parts and two temporal key parts indicating a temporal beginning value and a temporal end value; and
    in response to receiving one of an insert statement, an update statement, and a delete statement pertaining to a changed row in the relational database,
        identify, by the processor, rows in the temporally unique index that have identical non-temporal key parts to the changed row, and
        compare, by the processor, the temporal key parts of the identified rows to the temporal key parts of the changed row to determine: whether the changed row is directly adjacent to both a temporally earlier row and to a temporally later row, whether a gap is detected between the changed row and a temporally earlier row, or whether a gap is detected between the changed row and a temporally later row.

12. The computer program product of claim 11, further comprising program code executable by a processor to:
    in response to detecting a gap, storing, by the processor, data about the gap in a gap list.

13. The computer program product of claim 12, further comprising program code executable by a processor to:
    storing, by the processor, the gap list in a shared area of memory accessible to agents that have permission to access the temporally unique index in the relational database.

14. The computer program product of claim 13, wherein the gap list is maintained in the memory as a searchable tree.

15. The computer program product of claim 12, wherein the gap list is a linked list that contains one or more of the following elements for each detected gap: a table identifier, an object identifier, an index identifier, non-temporal key parts, and start and end times for the gap.

16. The computer program product of claim 15, further comprising program code executable by a processor to:
    hashing, by the processor, at least some of the elements to preserve space in the memory.

17. The computer program product of claim 12, further comprising program code executable by a processor to:
    in response to receiving one of an insert statement, an update statement, and a delete statement pertaining to a changed row in the relational database, searching, by the processor, the gap list to determine whether the operation performed by the statement caused a gap.

18. The computer program product of claim 17, wherein:
the searching of the gap list is performed at the time of uniqueness violation checking for deferred uniqueness indexes; and
in response to determining that the operation caused a gap, rolling back the operation that caused the gap.

19. The computer program product of claim 12, wherein:
the gap list is readable and writable by only one database work unit at a time; and
the gap list contains gaps for only one temporally unique index at a time.

20. The computer program product of claim 12, further comprising program code executable by a processor to:
reducing, by the processor, the size of the gap list by combining one or more gaps or by removing known gaps, in accordance with a pre-defined set of rules, when a newly identified gap is added to the gap list.

21. A system for gap detection in a temporally unique index in a relational database comprising:
a data store operable to store a relational database, the relational database including a temporally unique index having a first set of keys, wherein each key in the first set of keys includes one or more non-temporal key parts and two temporal key parts indicating a temporal beginning value and a temporal end value; and
a server computer operable to control the relational database and operable to undertake method acts for processing user queries for data from the relational database, the method acts including:
in response to receiving one of an insert statement, an update statement, and a delete statement pertaining to a changed row in the relational database,
identifying, by the server computer, rows in the temporally unique index that have identical non-temporal key parts to the changed row, and comparing, by the server computer, the temporal key parts of the identified rows to the temporal key parts of the changed row to determine: whether the changed row is directly adjacent to both a temporally earlier row and to a temporally later row, whether a gap is detected between the changed row and a temporally earlier row, or whether a gap is detected between the changed row and a temporally later row.

* * * * *